June 29, 1943.  H. W. KOST  2,322,852
PANEL FASTENER
Filed June 29, 1942
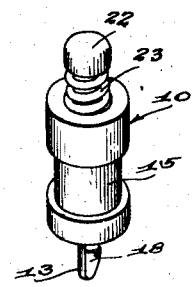
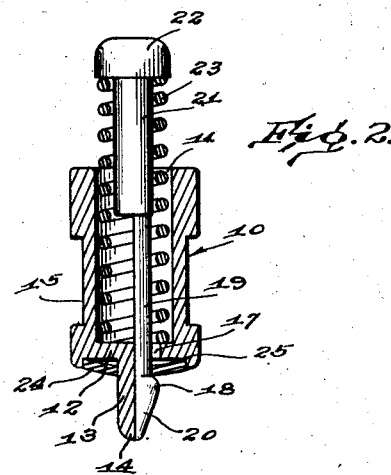
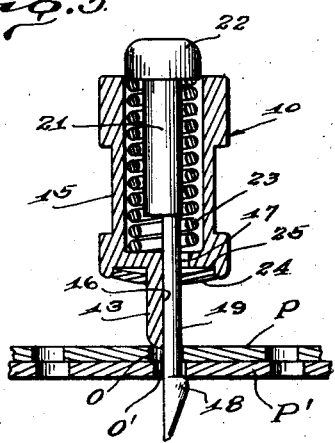
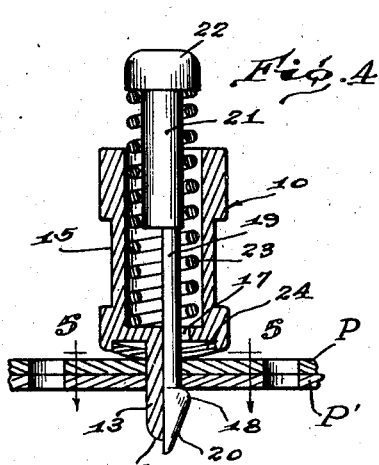
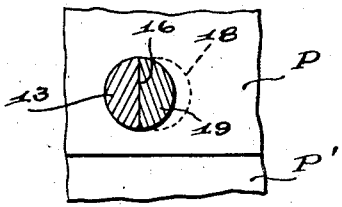
Inventor
Harold W. Kost
By Malcolm W. Fraser
Attorney Patented June 29, 1943

2,322,852

UNITED STATES PATENT OFFICE 2,322,852

PANEL FASTENER

Harold W. Kost, Birmingham, Mich., assignor to Detroit Harvester Company, Detroit, Mich., a corporation of Michigan Application June 29, 1942, Serial No. 448,985

6 Claims. (Cl. 85—5)

This invention relates to temporary rivets or fasteners for preliminarily securing together panels or sheets formed with registering apertures, these fasteners serving temporarily to secure these panels together until the rivets are installed or until welding is accomplished.

An object is to produce a panel fastener of this character which can be readily and conveniently applied to the apertured panels and which is reliable in construction and will satisfactorily withstand repeated applications to the work.

Another object is to increase the strength of fasteners of this character thereby to overcome objections inherent in similar fasteners which not infrequently break after a short period of time, often causing serious injury to the workmen.

A further object is to improve the construction of the panel fasteners with the view of facilitating assembling operations and provide for pre-locating of the fastener with respect to the panels.

A still further object is to produce a panel fastener having the new and improved features of construction, arrangement and assembly hereinafter more fully described, and for purposes of illustration but not of limitation, an embodiment of the invention is shown on the accompanying drawing in which Figure 1 is a perspective view of a panel fastener;

Figure 2 is an enlarged vertical sectional elevation of the fastener shown in Figure 1;

Figure 3 is an enlarged vertical or longitudinal sectional elevation of a fastener applied to two superposed apertured sheets or panels, showing the jaw carrying rod being inserted through the registering panel openings;

Figure 4 is a sectional view similar to Figure 3 but showing the position of the parts after the rod has been released and the panel clamped in position; and Figure 5 is a transverse sectional view on the line 5—5 of Figure 4.

The illustrated embodiment of the invention comprises a panel fastener having a metal cup-shaped body 10 having an open upper end 11. A transverse end wall 12 is disposed at the lower end portion of the body and integral therewith and projecting outwardly therefrom is a finger 13 which, as indicated in Figure 5, is semi-cylindrical in cross section. The lower end 14 of the finger 13 is rounded or tapered. The outside of the housing 10 has a reduced cylindrical portion 15 for the reception of the usual operating tool as will be readily understood by those skilled in this art.

It will be observed that the surface 16 of the finger 13 is flat and at one side and adjacent the flat side 16 in the transverse wall 12 is an enlarged opening 17. The hole 17 is large enough for the laterally extending projection 18 integral with the lower end portion of the rod 19, to pass freely therethrough. The end portion of the projection tapers inwardly indicated at 20 to facilitate the insertion of the rod through the registering openings in the panels or sheets as will hereinafter appear. As shown, the peripheral surface of the projection 18 is generally semi-circular and the rod 19 is semi-cylindrical. The flat surfaces of the rod and the finger abut each other and the rod is relatively slidable along the finger. The rod portion 19 is elongate and has an elongate cylindrical portion 21 integral with its outer end, this portion being concentric with respect to the bore of the housing 10 but eccentric with respect to the rod 19. Integral with the outer end of the cylindrical portion 21 is a dome shaped head 22. A helical coil spring 23 bears at one end against the inner side of the transverse wall 12 and at the outer end against the under side of the head 22. It will be observed that the elongate cylindrical portion 21 extends well within the spring 23 and cooperates with the inner walls of the housing 10 when pressure is imposed upon the cap 22 to compress the coil spring.

In assembling the parts, the coil spring 23 is first placed within the housing 10. Then the rod 19 is inserted through the spring and the spring is compressed to enable the lateral projection or jaw 18 to pass through the opening 17. Thereafter, a concavo-convex washer or disc 24 is slipped over the projection 18. The washer is formed with a round opening of a size slightly greater than the cylinder formed by the finger 13 and the semi-cylindrical rod 19. The outer end of the housing 10 is formed with an annular recess 25 to receive the washer 24 substantially as shown so that the latter bows outwardly away from the transverse wall 12. The washer may be retained in the recess 25 in any suitable manner, such as by a press fit, and, as will hereinafter appear, the outer rounded surface of the washer cooperates with the lateral projection or jaw 18 in clamping the panels together. It will be manifest that the washer confines the rod 19 from lateral movement and retains the rod in the proper relation to the finger 13 enabling the rod to slide along the finger.

In practice, it will be apparent that upon depressing the head 22 to compress the coil spring 23 the lateral projection 18 can be conveniently inserted through the registering openings O and O' of the superposed panels P and P'. Such insertion can be made even though the openings O and O' are slightly out of register as indicated in Figure 3. Thereafter, the finger 13 is forced through the registering openings until the rounded surface of the washer or disc 24 engages the top panel. Thereafter by releasing the head 22 the coil spring 23 retracts the lateral projection or jaw until it engages the under panel P' as indicated in Figure 4. In this manner the panels P and P' are clamped in place by the cooperative action of the jaw 18 and the rounded disc 24.

One outstanding characteristic of this fastener resides in the ability of the fastener to be applied to the apertured sheets and panels sufficiently to bring the holes O and O' into registration without depression of the head 22 to project the lateral projection 18. For this purpose the nose formed by the tapered projection 18 and the rounded end 14 of the finger 13 are so designed that when these parts are in their normal position prior to depression of the head, this nose may enter the apertures O and O' a sufficient extent to cause them to be approximately aligned. In other words, there is sufficient penetration of this nose initially to align the panels in the desired position. Thereafter, upon depression of the head 22 to advance the clamping jaw 18, the body or housing 10 is required to back up slightly until the jaw 18 can be readily advanced through the aligned holes O and O'. Thereupon the finger 13 can be fully inserted and upon release of the head 22, the parts are in the desired clamping position. The construction of the nose in this fashion is of importance in that it eliminates the necessity of the workman who, over an extended period of time, repeatedly applies fasteners of this character to panels, to be fatigued by initial depression of the head 22 to apply the fastener to the desired locating position. This arrangement provides for initial locating of the fastener prior to the work of depressing the head 22. In most fasteners of this character, preliminary locating in this manner can not be accomplished but on the contrary, it is necessary for the plunger or rod to be depressed against the force of a spring.

An important feature of the invention resides in the unitary construction of the pin or rod 19. It will be observed that the head 22, the cylindrical portion 21, rod 19 and lateral jaw 18 are all in one piece. This militates against the danger of the head coming off during the use of the fastener. Heretofore, serious accidents have taken place due to the parts breaking and injuring the operator because obviously a relatively strong spring must be employed. This arrangement is made possible by the use of the washer 24 which permits a relatively large opening to be formed in the lower wall of the housing through which the jaw 18 can be passed in the assembling operations. It will further be observed that this fastener can be applied to the panels by a straight line thrust as distinguished from a hooking operation frequently employed for this purpose.

It is to be understood that numerous changes in details of construction, arrangement and operation may be effected without departing from the spirit of the invention especially as defined in the appended claims.

What I claim is:

1. A panel fastener comprising a transverse wall, a locating finger projecting axially from said wall, said wall having an aperture at one side of said finger and juxtaposed thereto, a rod having a lateral clamping jaw at one end, said aperture being of sufficient size to admit said jaw, an integral enlarged head on the opposite end of said rod, a separate abutment plate member on one side of said wall and in contact therewith at least at the peripheral portion thereof and having an opening admitting the passage of the enlarged head therethrough and fitting relatively snugly said finger and rod whereby to prevent retrograde movement of said jaw through said aperture, means to hold said member against lateral movement, and a spring interposed between said head and transverse wall.

2. A panel fastener comprising a cup-shaped housing open at one end, a transverse wall at the opposite end, a finger semi-circular in cross section projecting axially from said wall, there being an enlarged opening through said wall at one side of said finger, a rod having an intermediate semi-circular portion in gliding contact with said finger and cooperating therewith to produce approximately a cylinder, the cross section of said semi-circular portion being smaller than said opening, a laterally projecting jaw on the outer end portion of said rod of a size capable of passing through said enlarged opening, a separate abutment plate member on the outer side of said transverse wall and in contact therewith at least at the peripheral portion thereof and having an opening through which said finger and intermediate rod portion extend, said separate member holding said rod against lateral movement but enabling sliding movement thereof, the rod being slidable to dispose the jaw beyond the end of said finger, the opening in said separate abutment plate member being sufficiently large so as to permit passage of the jaw therethrough, but smaller than the combined width of said finger and said jaw, and a spring urging said jaw toward said separate member.

3. A panel fastener comprising a cup-shaped housing open at one end, a transverse wall at the opposite end, a finger semi-circular in cross section projecting axially from said wall, there being an enlarged opening through said wall at one side of said finger, a rod having an intermediate semi-circular portion in gliding contact with said finger and cooperating therewith to produce approximately a cylinder and a jaw on one end thereof, the cross section of said semi-circular portion and said jaw being smaller than said opening, a separate cupped washer on the outer side of said wall having an opening snugly to fit the finger and intermediate portion of said rod and being narrower than the combined width of said finger and said jaw, an abutment on the inner end portion of said rod, and a coil spring between said abutment and transverse wall for normally urging said jaw toward said disc.

4. A panel fastener comprising a cup-shaped housing open at one end, a transverse wall at the opposite end, a finger semi-circular in cross section projecting axially from said wall, there being an enlarged opening through said wall at one side of said finger, a rod having an intermediate semi-circular portion in gliding contact with said finger and cooperating therewith to produce approximately a cylinder, the cross section of said semi-circular portion being smaller than said opening, a laterally projecting jaw on the outer end portion of said rod of a size capable of passing through said enlarged opening, a separate cupped washer on the outer side of said wall having an opening snugly to fit the finger and intermediate portion of said rod, the face of said cupped washer adjacent said opening therein, when in assembled position on said housing, blocking said jaw from retrograde movement through said opening, an elongate cylindrical portion integral with the inner end portion of said rod and eccentric thereto, an integral head on the outer end of said cylindrical portion, and an helical spring substantially fitting said cylindrical portion and bearing respectively against said head and said transverse wall.

5. A panel fastener comprising a transverse wall, a locating finger projecting axially from said wall, an aperture in said wall at one side of said finger and juxtaposed thereto, a rod having a laterally clamping jaw at one end, said aperture being of sufficient size to admit said jaw, an integral enlarged head on the opposite end of said rod, a separate abutment plate member on one side of said wall and in contact therewith at least at the peripheral portion thereof and having an opening fitting relatively snugly said finger and rod rearwardly of said jaw and having guiding influence on the axial movement of said rod, means to hold said member against lateral movement, a spring interposed between said head and transverse wall, an inwardly tapered surface on said clamping jaw, a tapered surface on the end portion of said finger adapted to cooperate with the tapered surface on said jaw to form a pre-locating nose adapted to fit preliminarily into the panel openings.

6. A panel fastener comprising a transverse wall, a locating finger projecting from said wall, said finger being semi-cylindrical in cross section substantially throughout its length, a rod having a lateral clamping jaw spaced inwardly from the outer end thereof, said rod being slidable along the flat face of said finger, spring means for said rod to urge said jaw toward the outer side of said transverse wall, and the outer end of said rod tapering laterally away from said finger from the outer end of the rod to said clamping jaw to form a cam surface whereby the finger and tapered end portion of said rod cooperate to form a locating and aperture aligning nose to facilitate insertion through panel apertures preliminary to advancing the rod through such apertures.

HAROLD W. KOST.